March 10, 1970 R. V. THOMAS 3,500,156
ELECTRONIC DAMPING SYSTEM AND METHOD FOR DOUBLE
ROTOR-STATON STEPPING MOTOR
Filed Jan. 24, 1968 2 Sheets-Sheet 1
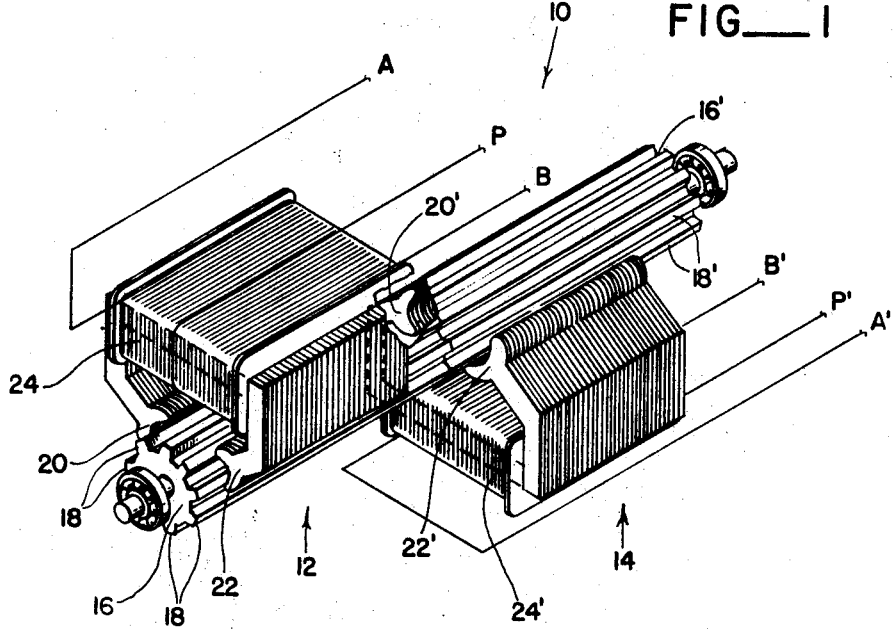
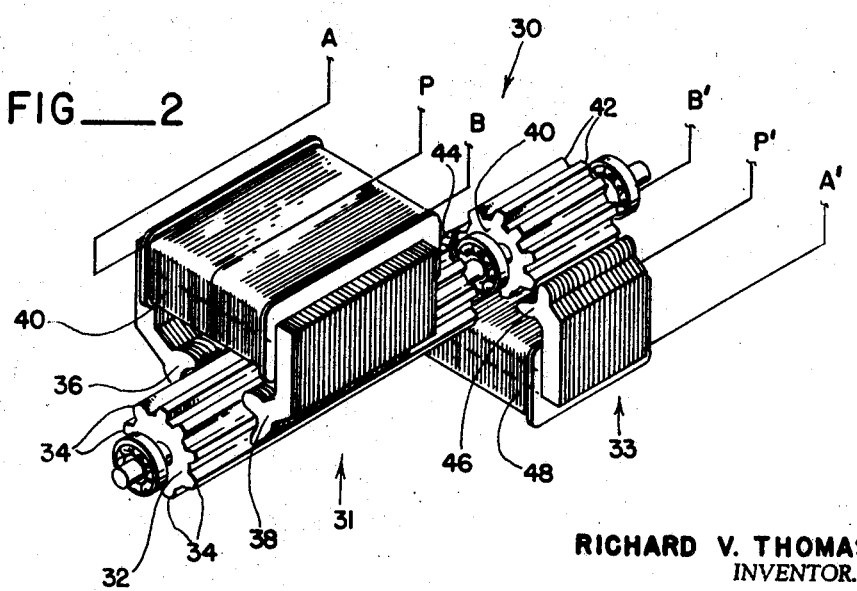
RICHARD V. THOMAS
INVENTOR.
BY
Graybeal, Cole & Barnard
ATTORNEYS

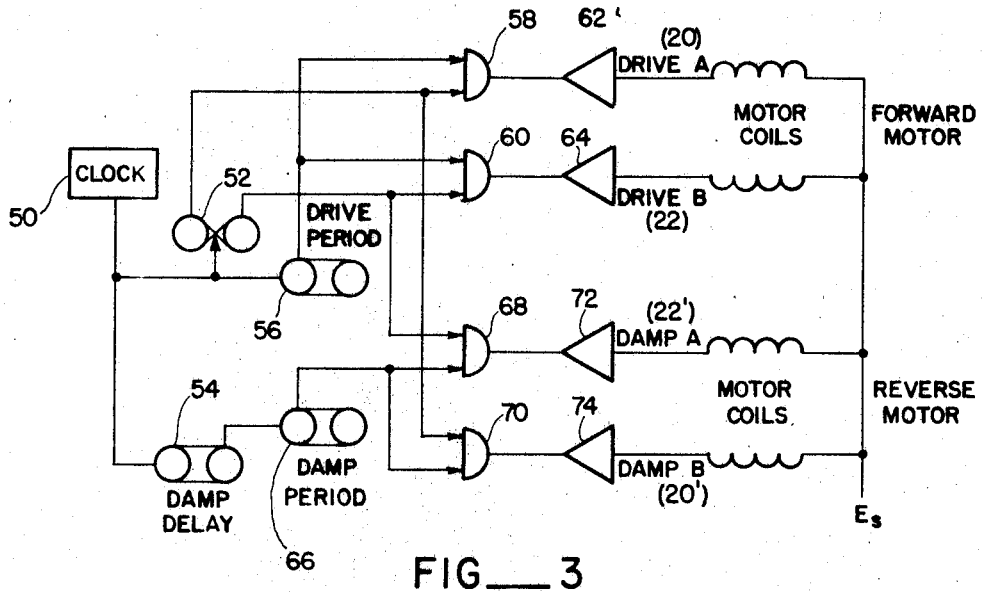
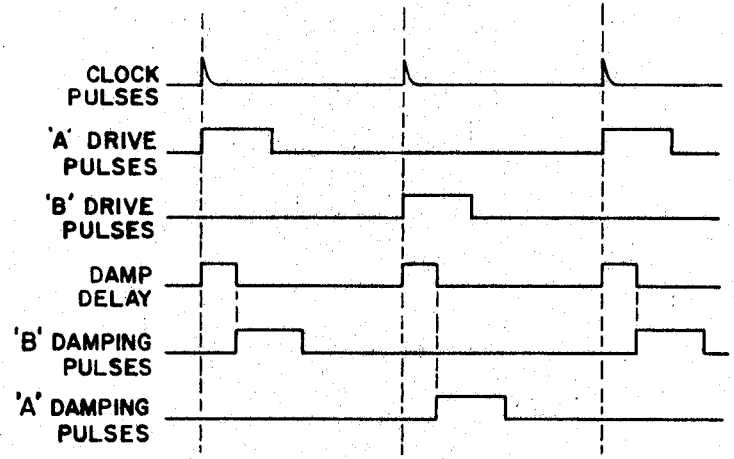
FIG__3
FIG__4
RICHARD V. THOMAS
INVENTOR.

United States Patent Office 3,500,156
Patented Mar. 10, 1970

3,500,156
ELECTRONIC DAMPING SYSTEM AND METHOD FOR DOUBLE ROTOR-STATOR STEPPING MOTOR
Richard V. Thomas, Seattle, Wash., assignor to Tally Corporation, Seattle, Wash., a corporation of Washington
Filed Jan. 24, 1968, Ser. No. 700,101
Int. Cl. H02k 37/00; H02p 3/10
U.S. Cl. 318—138                            10 Claims

ABSTRACT OF THE DISCLOSURE

Electronic damping system for both bidirectional and unidirectional stepping motors having rotors that require no windings. Since separate pole pieces and windings are provided for both forward and reverse operation of the stepping motor, operation of a motor in a given direction idles the coils required to drive the motor in the opposite direction. Rotative step movement is produced by a drive pulse to the forward windings and a damping pulse to the idle reverse coils to absorb oscillatory energy at the termination of an incremental rotative step movement of the rotor. The damping pulse to the reverse coils is delayed with respect to the drive pulse supplied to the forward coils. Unidirectional motors are damped in the same way by the provision of an additional rotor segment having its own pole pieces and windings.

BACKGROUND OF THE INVENTION

This invention relates generally to the field of stepping motors and more particularly to electronic damping means for such motors.

As those skilled in the art are aware, stepping motors have a great number of specialized applications requiring incremental rotative drive movement. A pervasive problem associated with step-by-step rotation is the oscillatory movement or "hunting" of the rotor at the termination of each step movement which may cause it to falsely gain or lose a step. The success of the motors in a particular application depends to a great extent upon the number of steps per second at which they can be driven. If the oscillations at the termination of a step are pronounced and extensive, the stepping rate is obviously affected. Numerous types of damping means have been employed which are generally mechanical in nature, that is pneumatic or hydraulic. Electrical slug-type damping has also been tried with little success. Mechanical dampers, particularly are expensive, subject to wear of the various parts thus decreasing reliability, and have relatively short life. Furthermore, amplitude of rotor oscillations where mechanical dampers are employed still may be too large thus limiting the effective stepping speed at which a motor can be rated. In short, mechanical damping is not positive enough, nor is it sufficiently precise in lessening rotor overshoot.

U.S. Patent No. 2,834,896 illustrates a pneumatic-type damper used extensively with stepping motors. U.S. Patent No. 3,286,109 shows a step motor damped by a viscous fluid filling as another example of mechanical-type damping. U.S. Patent No. 2,830,246 employs locking rollers to reduce rotor oscillations. An eccentric magnet oscillation control is illustrated in U.S. Patent No. 3,260,871, and finally, U.S. Patent No. 3,293,459 shows another form of mechanical damper. None of the above-noted prior art patents touches on the electronic techniques employed in the instant application.

SUMMARY

The electronic damping system of this invention involves either a bidirectional stepping motor or a unidirectional stepping motor which is provided with auxiliary poles and coils together with an additional rotor segment. In either case whether the motor be directional or unidirectional, there will be idle coils when the motor is being driven in a given direction. Drive pulses of appropriate duration and amplitude are supplied to the coil of one drive pole in the forward motor. A delayed damping pulse of predetermined amplitude and duration is then supplied to the positionally related pole of the reverse motor or auxiliary motor. Pulsing the reverse or idle coils permits the reverse or auxiliary motor to absorb oscillatory energy at the termination of a high speed incremental movement so that the rotor will not falsely gain or lose a step. The next drive pulse is supplied to the second drive pole of the forward motor. A delayed damping pulse is then triggered to the second pole of the reverse or auxiliary motor, also in positional relationship with the second drive pole. The damping system involves the use of a delay and a period generating device (one shots) associated with each phase of the motor drive circuits suitably coupled through power amplifiers and current controlling networks to the respective reverse or auxiliary motor coils.

Accordingly, it is among the many purposes of this invention to provide an electronic damping system which increases the performance of stepping motors as well as increasing both motor and damping reliability. Another feature is that the electronic damping system eliminates complex mechanical dampers and thereby reduces costs. Still another feature is to furnish an electronic damping system for stepping motors which greatly increases the asynchronous stepping operation of a motor over the stepping rate of motors using mechanical dampers. Another feature is to increase torque of the stepping motors even at maximum stepping rates.

BRIEF DESCRIPTION OF DRAWINGS

FIG. 1 is a simplified view in perspective of the essential parts of a reversible stepping motor illustrating the separate pole pieces and pole coils as well as separate rotor segments for a bidirectional motor;

FIG. 2 is also a simplified view in perspective illustrating the manner in which electronic damping would be adapted to a unidirectional motor by the provision of a separate rotor segment as well as by auxiliary poles and coils for such auxiliary rotor segment;

FIG. 3 is a schematic logic diagram generally illustrating the electronic circuitry necessary for supplying drive and damping pulses to the various motor coils; and FIG. 4 is a timing diagram illustrating correct pulse input points and to reference the timing relationships.

DESCRIPTION OF PREFERRED EMBODIMENTS

The invention is concerned with lobe-type rotor stepping motors as illustrated for instance in U.S. Patent No. 2,834,896. As shown therein, a stepping motor will have a plurality of poles and windings with a minimum of two in number. Permanent magnet means may also be used as an integral part of the step-by-step operation of these motors. The stepping motion is accomplished by flux switching from one pole to the other where the teeth of one pole will be aligned with the lobes and the teeth of the other pole will be aligned with spaces between the lobes. Lobe position with respect to teeth on the poles establishes alternate flux paths in the motor. Each pulse of alternating polarity applied to the motor coil advances the rotor one step by switching magnetic flux from one path or pole to the other. The bidirectional stepping motor is in effect two unidirectional motors on a common shaft with each having a preferential drive direction. Each motor will have its own rotor segment, pole pieces, and windings.

FIG. 1 shows a reversible bidirectional stepping motor generally designated by the number 10. Motor 10 has forward motor section 12 and reverses motor section 14. The forward motor has rotor segment 16 with lobes 18. It also has drive poles 20 and 22 angularly spaced from each other and having teeth thereon adjacent lobes 18. The motor has drive coil 24 with pulse input line A which for example induces magnetic force in pole 20. It also has center tap input power line P, and drive input pulse line B which for example will induce magnetic force in pole 22.

In like manner, reverse motor 14 has rotor segment 16', lobes 18', poles 20' and 22', and coil 24'. In addition, the reverse motor has input drive pulse line A' (pole 22') and B' (pole 20') as well as center tap power input line P'. It will be appreciated that in a reversible or bidirectional stepping motor, a symmetry relation exists between the rotor lobes and poles of the two motors. The reverse motor will be turned around or 180° out of phase with the forward motor. The reverse motor coils and poles have been shown below the reverse rotor segment only for ease of illustration of the invention. Thus, phase A and A' inputs to poles 20 and 22' of the forward and reverse motors may be aligned with the rotor lobes, and in like manner phase B and B' drive inputs to drive poles 22 and 20' may be aligned with spaces between the lobes, and conversely. It will be appreciated that in actuality there will be a fractional angular offset of the rotor segments due to the different drive directions of the two motor sections. Since instant reversibility is desired, the need for an A phase drive pulse to the forward motor for the next stepping movement will also require an A phase drive pulse to the opposite drive motor in order to effect instant reversal of the stepping motor with the next incoming pulse.

The unidirectional motor shown in FIG. 2, and generally designated by number 30, has rotor 32, lobes 34, poles 36 and 38, coil 40, input drive pulse lines A and B, and power input center tap line P. In order to provide for electronic damping of the unidirectional motor 30, it is necessary to add an external rotor subsection 40 having lobes 42, drive poles 44 and pole 46, and coil 48. The motor subsection 33 will have damping pulse input lines A' and B' as well as power input line P'. Lobes 34 and 42 of the two rotor sections 32 and 40 will be substantially aligned as in the bidirectional motor. Pole pieces 44 and 46 of the auxiliary damping motor 33 will be aligned with pole pieces 36 and 38 respectively of the main motor 31. Since the auxiliary or damping motor subsection 33 is used for damping only and does not have drive capability it can be made as an attachment or built in. The damping motor can be either an integral or an external part of the unidirectional motor having a common rotor with separate poles and windings or with a separate rotor as shown, internally or externally mounted of the motor housing, together with separate poles and windings.

FIG. 3 shows the logic circuitry necessary for damping the reversible motor running in the forward direction or for damping the unidirectional motor. Clock 50 triggers a drive pulse to a complimentary binary divide-by-two counter or bistable 52. At the same time, the input pulse triggers damp delay monostable 54 and drive period determiner monostable 56. The action of counter 52 and drive period determiner 56 is to route the input signal through one or the other of AND gates 58 and 60 and through the appropriate drive A or drive B power amplifiers 62 and 64. Such action of the counter and drive period determiner advances the motor one step in a forward direction. Damp delay monostable 54 creates a waiting period before damp period determiner 66 is triggered. Damp period determiner 66 then applies the damping pulse through one or the other of AND gates 68 and 70. The AND gate output is routed through one or the other of power amplifiers 72 and 74 which in turn apply the damping pulse to the appropriate motor coil.

It will therefore be noted that power on drive A (pole 20) for instance of forward motor 12 will result in application of the delayed damping pulse to the damp) B (pole 22') of the reverse motor. Conversely a trigger on drive B (pole 22) of the forward motor will result in application of the delayed damp pulse to damp A (pole 20') of the reverse motor. The logic illustrated in FIG. 3, as mentioned above, will provide forward motor operation and damping. However, the forward and reverse motors can be interconnected in such a way that drive pulses are applied to the reverse motor and the damping pulses are applied to the forward motor. Means for interchangeably driving the forward and reverse motors can be done either electronically or with an electro-mechanical relay, depending upon speed of operation needed. The clock or pulse generator is not actually necessary as a part of the electronic damping system, but is shown to illustrate the correct input point and to reference the timing relationships. Also as mentioned above, the motor subsection or auxiliary motor attached to the unidirectional drive motor is used for damping only and does not necessarily have the capacity to allow opposite rotation. Accordingly, the auxiliary motor 33 need only be a lower powered version of the reverse motor. In the unidirectional motor, therefore, a phase A drive impulse to motor 31 will result in a phase B damp pulse to auxiliary or damping motor 33.

The timing diagram of FIG. 4 illustrates that the clock triggers either the A or B drive and at the same time triggers the damp delay. The trailing edge of the delay pulse triggers a damping pulse to the appropriate reverse motor coil. Application of the damper pulses must be delayed to provide optimum maximum repetition rate of the stepping motor. Furthermore, the maximum drive period and the maximum damper period must be limited in order to allow for maximum repetition rate of the motor. Even so, torque does not suffer and optimum performance obtains at all input clock rates below maximum. Driving either one pole or the other of a particular motor can be achieved by oppositely wound coils or by reversing the polarity of the pulses.

Those skilled in the art will understand that driving a motor from one position requires that the damping pulse must be applied at the next position of the opposite motor. For example, the rotor is in such a position that the narrowest air gap is on the A phase of each motor. When the motor is advanced a step, the next narrowest air gap will be at phase B of each motor. Thus, an A phase drive to one motor requires a damping pulse to the B phase of the opposite motor in order for the electronic damping to be effective. It will be appreciated that the general principles illustrated herein could easily be applied to a motor which is moved without interruption through two or more steps. Damping pulses are applied to the phase of the opposed motor at which the rotor will come to rest.

The foregoing is considered to be illustrative only of the principles of this invention. Numerous modifications and changes will readily occur to those skilled in the art and hence it is not desired to limit the invention to the exact construction and method shown and described. Accordingly all suitable modifications and equivalents may be resorted to which fall within the scope of the invention.

What is claimed is:
1. Damping system for stepping motors, comprising:
 (a) a stepping motor having rotor means with two zones axially displaced from each other for rotational movement on a shaft, each rotor zone having separate and distinct pole means and coil means,
 (b) first circuit means for said stepping motor including means for selectively supplying drive pulses to coil and pole means for one of said rotor zones for incremental drive rotation of said shaft in a predetermined direction, and (c) second circuit means for said stepping motor including means for selectively supplying damping pulses to coil and pole means for the other rotor zone in delayed timed relationship to said drive pulses whereby said other rotor zone is capable of absorbing and damping oscillatory energy of said rotor means.

2. The damping system according to claim 1 and in which the pole and coil means for each of said rotor zones comprises at least two input phases at least one of which will have greater air gap displacement from said rotor and at least the other of which will have lesser air gap displacement from said rotor.

3. The damping system according to claim 2 and in which damping pulses are applied to that phase of the coil and pole means which will have the lesser air gap when incremental rotational drive movement is terminated.

4. Electronic damping system for stepping motors, comprising:

(a) a stepping motor having an elongated rotor means with first and second axially spaced rotor portions fixedly mounted on a shaft for incremental rotative movement, (b) a pair of angularly spaced apart first pole means mounted in operable relationship with said first rotor portion and a pair of angularly spaced apart second pole means axially displaced from said first pair of pole means and mounted in operative relationship with said second rotor portion, (c) first coil means for said first pair of pole means and second coil means for said second pair of pole means, said first and second coil means selectively inducing magnetic forces in their respective pole means which induces torque on one rotor portion which is opposed to torque induced on the other of said rotor portions, and (d) electronic circuit means selectively applying drive pulses to one of said first and second coil means so that the motor is driven in incremental rotative drive movement in a predetermined direction, said electronic circuit means also selectively applying delayed damping pulses with respect to said drive pulses to the other of said first and second coil means whereby said second rotor position is capable of absorbing and damping oscillatory energy of said elongated rotor means at the termination of an incremental rotative drive movement.

5. The electronic damping system of claim 4 and in which one pole of each pair has a greater air gap displacement from its rotor portion and the other pole of each pair has a lesser air gap displacement from its rotor portion.

6. The electronic damping system of claim 5 and wherein said damping pulses are so applied that magnetic forces are induced in the pole which will have the lesser air gap with its rotor portion when incremental rotative drive movement is terminated.

7. Electronic damping system for stepping motors, comprising:

(a) a bidirectional stepping motor having an elongated rotor means with first and second rotor segments fixedly mounted axially adjacent each other on a common shaft for incremental rotative movement, (b) at least two angularly spaced apart forward drive pole means mounted in drive relationship with said first rotor segment for forward stepping movement and at least two angularly spaced apart reverse drive pole means mounted in drive relationship with said second rotor segment for reverse stepping movement, (c) forward coil means for said forward pole means and reverse coil means for said reverse pole means, said forward and reverse coil means being adapted to selectively induce magnetic stepping drive forces to their respective drive pole means, and (d) electronic circuit means selectively applying drive pulses to one of said forward and reverse coil means so that the motor is stepped in a given direction thereby idling the other coil means for stepping the motor in the opposite direction, said circuit means also selectively applying delayed damping pulses with respect to said drive pulses to the other coil means whereby the non-driven rotor segment is capable of absorbing and damping oscillatory energy of the rotor means at the termination of an incremental rotative drive movement.

8. The electronic damping system of claim 7 and in which one pole of both said forward and reverse pole means has a greater air gap displacement from its rotor portion and another pole of both said forward and reverse pole means has a lesser air gap displacement from its rotor portion.

9. The electronic damping system of claim 8 and wherein said damping pulses are so applied to the other coil means that magnetic forces are induced in the pole which will have the lesser air gap with its rotor portion when incremental rotative drive movement is terminated.

10. In an electronic damping system method for stepping motors having two rotor segments mounted axially adjacent each other for intermittent rotative motion on a common shaft and also having separate and distinct pole means and coil means for each rotor segment, the steps of:

(a) directing a drive pulse of predetermined duration to the coil and pole means of one rotor segment for incremental rotative drive movement of said shaft, and (b) providing a damping pulse of predetermined duration to the coil and pole means of the other rotor segment, said damping pulse being delayed a predetermined period with respect to the beginning of said drive pulse whereby said other rotor segment is capable of absorbing and damping oscillatory energy of said one rotor segment generally at the termination of an incremental rotative drive movement.

References Cited

UNITED STATES PATENTS

| | | | |
|---|---|---|---|
| 3,218,535 | 11/1965 | Holthaus et al. | 318—138 |
| 3,327,191 | 6/1967 | Goto | 318—138 |
| 3,328,658 | 6/1967 | Thompson | 318—138 |
| 3,345,547 | 10/1967 | Dunne | 318—138 |
| 3,386,018 | 5/1968 | Smith et al. | 318—138 |

WARREN E. RAY, Primary Examiner

U.S. Cl. X.R.

310—49, 114